Patented Nov. 18, 1952

2,618,642

UNITED STATES PATENT OFFICE 2,618,642

PROCESS FOR PRODUCING NONCRYSTALLIZING COPPER PHTHALOCYANINE

Jacob L. Keller, Cranford, and Lawrence D. Lytle, Plainfield, N. J., assignors to General Aniline & Film Corporation, New York, N. Y., a corporation of Delaware No Drawing. Application October 5, 1950, Serial No. 188,652

5 Claims. (Cl. 260—314.5)

This invention relates to a process for improving the physical properties of copper phthalocyanine, particularly the tendency of copper phthalocyanine to crystallize.

Coloring matters of the phthalocyanine series, particularly the blue halogen-free copper phthalocyanine, have tinctorial properties and light fastness qualities which recommend them particularly for use as pigments for paints, lacquers, and printing compositions. However, they are subject to a tendency to flocculate and crystallize from the organic solvent employed as the vehicle. By flocculation is meant the tendency of the pigment to settle out from the paint or lacquer. This is a disadvantage where white pigments such as zinc oxide or titanium dioxide are employed to dilute the copper phthalocyanine pigment since the weakening effect of flocculation on the tinctorial value of the latter is then particularly noticeable. In printing inks and lacquers, the weakening effect of flocculation is not as objectionable, since the copper phthalocyanine pigment as a rule is employed full strength in such mixtures. The added tendency of chlorine-free copper phthalocyanine to crystallize from the organic solvent or vehicle presents a more serious problem, since an initial crystallization generally occurs rather soon after the copper phthalocyanine pigment has been mixed with the solvent and this is followed by a slower crystallization process upon further standing, resulting in a considerable degree of crystallization after one or two hours. This crystallization or crystal growth is practically irreversible. In view of the deleterious effects of crystallization, the use of such copper phthalocyanine pigments, which otherwise constitute valuable coloring matters, is somewhat limited. When employed in a lacquer, for instance, it is difficult for the user to obtain the full color value and the strength of the color may vary from day to day, resulting in shade and strength differences from the same supply of lacquer.

Numerous suggestions have been made to overcome this tendency of halogen-free copper phthalocyanine to crystallize and flocculate. One such method is based upon the addition of tin phthalocyanine to the copper phthalocyanine. In accordance with this method, the two phthalocyanine pigments may be pre-mixed or brought together by the paint mixer. Should it be necessary for the copper phthalocyanine to remain in the vehicle for any length of time prior to the addition of the tin phthalocyanine, the crystallization of the former would be initiated and the deterring effect of the added tin phthalocyanine would not be realized. Furthermore, tin phthalocyanine is somewhat unstable in sulfuric acid, with which copper phthalocyanine is generally treated in order to obtain a fine dispersion. Consequently, the mixing of tin phthalocyanine with the copper phthalocyanine prior to dispersion of the latter would introduce difficulties. Also, it would appear that the addition of tin phthalocyanine has some modifying effect on the shade of the copper phthalocyanine.

Another method for controlling the crystal growth of copper phthalocyanine in the vehicle contemplates the formation of an aluminum benzoate lake or compound pigment with the copper phthalocyanine. In this method the mixing must take place in the liquid or paste form, since purely physical mixtures of dry aluminum benzoate and dry copper phthalocyanine do not produce the non-crystallizing effect. The aluminum benzoate of this process forms the sub-stratum of the lake or compound pigment and has no color value. It, therefore, acts to dilute or diminish the tinctorial strength of the copper phthalocyanine pigment. Accordingly, this process can only be employed where full color strength is not desired.

It is an object of the present invention to produce a non-crystallizing, non-flocculating, blue copper phthalocyanine pigment which may be employed in liquid pigmenting compositions free of the defect of crystallization and without the necessity of adding other pigments or materials to stabilize against crystallization and flocculation. For the purposes of definition a non-crystallizing copper phthalocyanine may be said to be one which will show very few or no crystals upon standing 72 hours in a toluene solution.

We have found that copper phthalocyanine may be converted to a non-crystallizing form by heating it with anhydrous aluminum chloride in a trichlorbenzene solution. According to this procedure, the copper phthalocyanine is first introduced into the trichlorbenzene with agitation, any water present being removed from the mixture by any convenient method. We have found it advantageous to remove the water by distillation at 100° C. under vacuum. After the water has been removed from the copper phthalocyanine-trichlorbenzene mixture, the anhydrous aluminum chloride is added and the mixture heated to about 180° C., after which it is filtered and the trichlorbenzene removed, for instance by steam distillation. The residue is then treated with either sodium hydroxide solution or hydrochloric acid solution, and boiled with live steam for a short time. It is then filtered hot, washed neutral, and dried.

The resulting crude product, which is now non-crystallizing, may then be subjected to the usual refining or purifying treatments for copper phthalocyanine pigments. For instance, the crude base may be dispersed by dissolving it in 66° Bé. sulfuric acid, drowning it in water in the usual manner, and recovering the pigment by filtration and washing. We have also found it advantageous to add small amounts of chlorine, from 1 to 2% of the amount of pigment, during the heating together of the copper phthalocyanine and aluminum chloride mix dispersed in the trichlorbenzene. This small amount of chlorine appears to produce a catalytic effect during the reaction and definitely improves the tinctorial strength of the product and the non-crystallizing properties. These amounts of chlorine are not sufficient to produce any appreciable amount of chlorinated phthalocyanine, and larger proportions of chlorine cause the products to revert to a crystalline form.

Although smaller proportions of aluminum chloride are effective, we have found it desirable for optimum results to employ an amount of aluminum chloride equal to at least 50% of the amount of copper phthalocyanine and preferably about 75% of the amount of copper phthalocyanine.

The following examples will serve to more fully illustrate the invention and it is understood that the specific conditions and proportions recited therein are not given as limitations but are illustrative of the best method of performing the process:

EXAMPLE 1

Into a 1 liter glass fusion pot with anchor type stirrer, there are charged in order 660 cc. (1,000 g.) trichlorbenzene and 150 g. copper phthalocyanine testing 0.23% Cl. Vacuum is applied and the mixture heated to 100° C. in order to remove any water from the reagent. After a few cc. of trichlorbenzene have distilled over and no more water is evident, the vacuum is released and at 100–110° C. there are added 112.5 g. aluminum chloride anhydrous. The temperature of the mixture is then raised to 180° C. in one hour, maintained at 180° C. for two hours, then cooled to 100° C., filtered, and the filter cake washed with 265 cc. trichlorbenzene. The filter cake is then sucked dry and steam distilled until all of the solvent has been removed. To the residue there are then added 150 cc. sodium hydroxide 46° Bé. and this solution boiled with live steam for 15 minutes. The solution should be strongly alkaline. It is then filtered hot, washed neutral with hot water, dried at 90° C. in air, and ground to pass 40 mesh.

Dispersion

Into a 2 liter flask equipped with stirrer and thermometer, there are charged 1,305 cc. (2,400 g.) sulfuric acid 66° Bé., to which is then added during one hour at 20° C., 150 g. of the copper phthalocyanine product of the above procedure. The mixture is then stirred at 20° C. for one hour or until complete solution is obtained. It is then drowned in water, filtered, washed dry at 90° C. in air, and ground in a hammer mill.

Any of the usual further after-treatments known to the art for improving the dispersibility or tinctorial properties may be employed.

EXAMPLE 2

Into a 1 liter glass fusion pot with anchor type stirrer, there are charged in order 400 cc.=600 g. trichlorbenzene and 150 g. copper phthalocyanine, testing 0.23% Cl. Vacuum is applied and the mixture heated to 100° C. in order to remove any water from the reagent. After a few cc. of trichlorbenzene have distilled over and no more water is evident, the vacuum is released and at 100–110° C. there are added 75 g. aluminum chloride anhydrous. The temperature of the mixture is then raised to 180° C. in one hour, maintained at 180° C. for two hours, then cooled to 100° C., filtered, and the filter cake washed with 265 cc. trichlorbenzene. The filter cake is then sucked dry and steam distilled until all of the solvent has been removed. To the residue there are then added 150 cc. sodium hydroxide 46° Bé. and this solution boiled in live steam for 15 minutes. The solution should be strongly alkaline. It is then filtered hot, washed neutral with hot water, dried at 90° C. in air, and ground to pass 40 mesh.

The product of this example may be dispersed and after-treated in the same manner as that of Example 1.

EXAMPLE 3

Into a 1 liter glass fusion pot equipped with stirrer, thermometer, and gas inlet tube, there are charged, in order, with continued agitation, 1,000 g. trichlorbenzene and 150 g. copper phthalocyanine, vacuum is applied, and the dispersion heated to 100° C. until all water has been removed. The vacuum is then released and there are added 112.5 grams aluminum chloride anhydrous, ground. The mixture is heated to 180° C. in one hour and maintained at this temperature for two hours, while passing in a slow stream 1–2 g. chlorine. The mixture is then allowed to cool to 100° C., the reaction mixture filtered, and the filter cake washed with 400 g. trichlorbenzene. The filter cake is then steam distilled until all trichlorbenzene has been removed from the pigment. In order to remove excess aluminum chloride, there are then added to the aqueous residue 400 cc. sodium hydroxide 46° Bé. and the mixture boiled with live steam for 15 minutes. This mixture should react strongly alkaline.

Instead of removing the excess aluminum chloride with the sodium hydroxide solution, it may be treated with 100 cc. of hydrochloric acid 20° Bé. and boiled with live steam for 15 minutes. Such a mixture should react strongly acid.

In either case, after the removal of the aluminum chloride the solution is filtered hot and washed neutral with hot water. The filter cake is then dried at 100° C. in air.

The crude product thus obtained in a yield of 140–150 g. may be then dispersed in 66° Bé. sulfuric acid, drowned in water in the usual manner, and the pigment recovered by filtration and washing. It is finally ground in a hammer mill. Yield: 135–145 g. of purified product. This product may be further treated by any of the procedures known to the art for the improvement of dispersibility and tinctorial properties of phthalocyanine pigments.

The product produced by these procedures has strong tinctorial properties and retains all of the best qualities of the copper phthalocyanine pigment. In addition, it does not exhibit the tendency to flocculate characteristic of most full strength phthalocyanine pigments, so that the strength of an enamel prepared with this pigment is the same when applied either by dipping or spraying. Prior to this invention, it was necessary to add dispersing or anti-flocculating agents in considerable amounts to the pigment, thus reducing the strength in order to achieve this result. Furthermore, the pigment treated in accordance with the procedure of this application does not exhibit the tendency to crystallize in coal tar solvents, such as benzene, toluene, and xylene. Lacquers incorporating the treated pigment are characterized by high container stability.

Having now fully described our invention and illustrated the best manner of performing it, what we claim as new is:

1. A process for the production of a non-crystallizing, non-flocculating, copper phthalocyanine which comprises charging copper phthalocyanine into trichlorbenzene, removing all water, adding anhydrous aluminum chloride, amounting to at least 50% by weight of the amount of copper phthalocyanine heating to about 180° C., filtering, removing the trichlorbenzene from the filter cake, and removing the excess aluminum chloride.

2. A process for the production of a non-crystallizing, non-flocculating, copper phthalocyanine which comprises charging copper phthalocyanine into trichlorbenzene, heating to 100° C. under vacuum until all water is removed, adding anhydrous aluminum chloride in an amount of at least 50% of the amount of copper phthalocyanine, heating to about 180° C., filtering, removing the trichlorbenzene from the filter cake, and removing the excess aluminum chloride.

3. A process for the production of a non-crystallizing, non-flocculating copper phthalocyanine which comprises charging copper phthalocyanine into trichlorbenzene, heating to 100° C. under vacuum until all the water is removed, adding anhydrous aluminum chloride in an amount of at least 50% of the amount of copper phthalocyanine, heating to about 180° C., filtering, steam distilling the filter cake until the trichlorbenzene has been removed, boiling in a sodium hydroxide alkaline solution to remove excess aluminum chloride, filtering hot, washing neutral, and drying.

4. A process for the production of a non-crystallizing, non-flocculating, copper phthalocyanine which comprises charging copper phthalocyanine into trichlorbenzene, heating to 100° C. under vacuum until all the water is removed, adding anhydrous aluminum chloride in an amount of at least 50% of the amount of copper phthalocyanine, heating to about 180° C., filtering, steam distilling the filter cake until the trichlorbenzene has been removed, boiling in a hydrochloric acid solution to remove excess aluminum chloride, filtering hot, washing neutral, and drying.

5. A process for the production of a non-crystallizing, non-flocculating, copper phthalocyanine which comprises charging copper phthalocyanine in trichlorbenze, removing all water, adding anhydrous aluminum chloride in an amount of about 75% of the amount of copper phthalocyanine, heating to about 180° C., maintaining this temperature for about two hours while passing in from 1-2% of chlorine based on the amount of pigment, filtering, removing the trichlorbenzene from the filter cake, removing the excess aluminum chloride, filtering hot, washing neutral, and drying.

JACOB L. KELLER.
LAWRENCE D. LYTLE.

No references cited.